US007348543B2

(12) United States Patent
Villaret

(10) Patent No.: US 7,348,543 B2
(45) Date of Patent: Mar. 25, 2008

(54) OPTICAL ENCODER WITH HOLLOW LIGHT GUIDE FOR INDICATING THE ANGULAR POSITION OF A ROTARY SHAFT

(75) Inventor: Yves Villaret, Hadera (IL)

(73) Assignee: Yaskawa Eshed Technologies Ltd., Rosh Haayin (IL)

( * ) Notice: Subject to any disclaimer, the term of this patent is extended or adjusted under 35 U.S.C. 154(b) by 175 days.

(21) Appl. No.: 10/542,199

(22) PCT Filed: Jan. 15, 2004

(86) PCT No.: PCT/IL2004/000042

§ 371 (c)(1),
(2), (4) Date: Jul. 14, 2005

(87) PCT Pub. No.: WO2004/063671

PCT Pub. Date: Jul. 29, 2004

(65) Prior Publication Data

US 2006/0108516 A1    May 25, 2006

Related U.S. Application Data

(60) Provisional application No. 60/440,390, filed on Jan. 16, 2003.

(51) Int. Cl.
*G01D 5/34* (2006.01)
(52) U.S. Cl. .................. 250/231.13; 250/231.14; 250/231.18; 356/614; 33/1 PT; 341/13
(58) Field of Classification Search ............ 250/231.13–231.18; 356/614–618; 33/1 PT; 385/34, 66, 84, 123, 127
See application file for complete search history.

(56) References Cited

U.S. PATENT DOCUMENTS

| 3,410,976 A | 11/1968 | Watson |
| 4,268,747 A | 5/1981 | Becchi et al. |
| 4,291,976 A | 9/1981 | McMahon |
| 4,410,798 A | 10/1983 | Breslow |

(Continued)

FOREIGN PATENT DOCUMENTS

DE    1259621    1/1968

(Continued)

*Primary Examiner*—Patrick J. Lee
(74) *Attorney, Agent, or Firm*—AlphaPatent Associates Ltd.; Daniel J. Swirsky

(57) ABSTRACT

An optical encoder assembly and a method for measuring a rotation angle in which optical beams are spread over the circumference of a rotating optical disk by means of optical guides (OG). In the preferred embodiment the rotating optical disk has a pair of concentrically arranged circular patterns with alternating transparent and opaque sections. Each beam is input via optical fibers to one of a pair of concentrically disposed OGs with a cylindrical shape (COGs) respectively and propagated through the optical disk to be reflected by a mirror with two concentrically disposed circular patterns of reflective and non reflective sections, reentering the COG through the optical disk in a reverse direction. The COGs then guide the light beams back to an electronic interface that converts the optical signals into electronic signals producing position information. Considerably elevated precision can be obtained due to the averaging of the light intensity going through the disk on a substantially large part of the optical disk.

33 Claims, 11 Drawing Sheets

U.S. PATENT DOCUMENTS

| | | |
|---|---|---|
| 4,475,034 A | 10/1984 | Maddox et al. |
| 5,129,725 A | 7/1992 | Ishizuka et al. |
| 5,981,941 A * | 11/1999 | Takata et al. .......... 250/231.16 |
| 6,054,938 A | 4/2000 | Nakajima et al. |
| 6,208,788 B1 | 3/2001 | Nosov |
| 6,844,542 B2 * | 1/2005 | Kirschbaum et al. .. 250/231.13 |
| 2003/0108295 A1 | 6/2003 | Huang |

FOREIGN PATENT DOCUMENTS

| | | |
|---|---|---|
| DE | 2155970 | 8/1972 |
| DE | 3133401 | 7/1982 |
| EP | 0646796 B | 4/1995 |
| GB | 2201527 | 9/1988 |
| GB | 2271031 | 3/1994 |
| JP | 2003 090920 | 3/2003 |
| WO | WO 00/67057 | 11/2000 |

\* cited by examiner

OPTICAL ENCODER WITH HOLLOW LIGHT GUIDE FOR INDICATING THE ANGULAR POSITION OF A ROTARY SHAFT

CROSS-REFERENCE TO RELATED APPLICATIONS

This application is a U.S. National Phase Application under 35 U.S.C. 371 of PCT International Application No. PCT/IL2005/000042, which has an international filing date of Jan. 15, 2004, and which claims priority from U.S. Provisional Patent Application No. 60/440,390, filed Jan. 16, 2003.

BACKGROUND

This invention relates to Optical Encoders that are of common use for electrical motors or other rotating devices. Examples of such optical encoders can be found in U.S. Pat. No. 4,268,747 by Becchi et al. (1981), and U.S. Pat. No. 4,410,798 by Breslow (1983).

Ever since their invention, Optical Encoders have been widely used as position feedback devices for rotary shaft position control in robots, automatic machines and other assemblies.

Known encoders use a rotating optical disc fixed on the motor shaft, the disc having a pattern of sections of alternating optical properties (for example slots having transparent and opaque sections). The disc is placed on the path of an optical beam, between a light emitter and a light sensor. The light sensor then creates an electronic signal the amplitude of which will change periodically according to shaft position. An electronic circuit is then used to count the number of periods of the electronic signal, thus providing information on the instant shaft position, relative to an initial position.

A pair of optical beams are used to sense the direction of rotation, wherein the path of the second beam is positioned in such a way as to produce a second electrical signal similar to the first one, but shifted in angular position by a quarter of the period of the first signal. Such two signals will be further said to be in quadrature.

An improvement of the above method consists of using a light beam that covers several of the sections with alternating optical properties, while placing a fixed mask between the rotating optical disc and the light sensor. The mask has a pattern identical to the disc pattern, and covers at least the surface of the light sensor. Whenever mask and disc patterns coincide, a maximum of light is transmitted whereas when the mask and disc and mask pattern are in opposite phase, light transmission is minimum. Thus the amount of light transmitted to the sensor and the amplitude of the electronic signal created by the sensor become a periodic function of the angular position.

There is a continuing trend of improving the precision and resolution of position feedback devices.

A first factor limiting precision is a small eccentric movement of the rotating optical disc, which is due to some mechanical tolerance. Since the two beams intersect the optical disc at defined positions on the disc, on one side of the shaft, a lateral movement of the shaft influences the amount of light that reaches the light detector, thus creating error in the position information. Such a lateral movement can be caused by tolerance in the roll bearing holding the shaft, or in the optical disc assembly.

A second factor is the precision of the pattern on the rotating disc. Irregularities in that pattern will generate unequal periods such that the optical disk will fail to indicate the angular position of the shaft. Since the two beams intersect the optical disc at a defined position on the disc, on one side of the shaft, irregularities of the disc pattern will influence the amount of light that reaches the light detector, introducing errors in the position information.

A third factor is the insufficient precision of the phase difference between the two signals in quadrature, this phase difference being obtained by a predetermined relative positioning of the two receptors, whose precision is limited.

In another aspect, when the resolution of an optical encoder is increased, the frequency of the electric signal generated is also increased. Such high frequencies become more difficult to transmit through wires and a problem of noise immunity arises. The wires must then be shielded, resulting in higher cost and reduced reliability of the system.

In some encoders, this difficulty is overcome by using a serial communication line between the encoder and the controller. However in this case an electronic circuit must be added to convert the electric signals into a serial code. Also a delay is introduced between the encoder position detection and the actual, position information read by the controller.

A further drawback of known Optical Encoders is the need for an electronic circuit inside the encoder itself. This electric circuit is most commonly used to shape the two electrical signals in square pulses. Such an electrical circuit requires power supply and thus additional wires to the encoder. Again the cable size and number of conductors is increased, resulting in a reduced reliability for example when used in an industrial environment. In addition the cost of the electronic interface and of assembling the interface inside the encoder is relatively high.

It is therefore desirable to design an Optical Encoder that overcomes the drawbacks of the commonly used encoders. It is desirable to have an Optical Encoder that requires no power supply and in which no delay is introduced in the position information. It is further desirable to have an optical encoder in which the position signal is a) immune to electrical noise, b) not sensitive to the mechanical eccentric movements of the disc during rotation, c) not sensitive to encoder disc mounting imprecision or to the irregularities of the encoder disc pattern and d) not sensitive to the mechanical vibrations of the disc.

SUMMARY OF THE INVENTION

The present invention concerns an Optical Encoder assembly comprising a rotating optical disc and a mirror, wherein optical beams are emitted from an electronic interface and transmitted by optical fibers to one or more Cylindrical Optical Guides having a symmetry axis with the same orientation as the rotation axis of the rotating optical disk. Due to the inventive design of the Cylindrical Optical Guides the optical beams emitted from the Cylindrical Optical Guides are distributed over the circumference of the rotating optical disc. Light beams are propagated through the rotating optical disc to the mirror and then reflected by the mirror such that they are propagated backwards through the said rotating optical disc to the Cylindrical Optical Guides and from the Cylindrical Optical Guides to the optical fibers to be transmitted to the said distant electronic surface where the position indication is produced.

DETAILED DESCRIPTION OF THE PREFERRED EMBODIMENT

Figure 1:
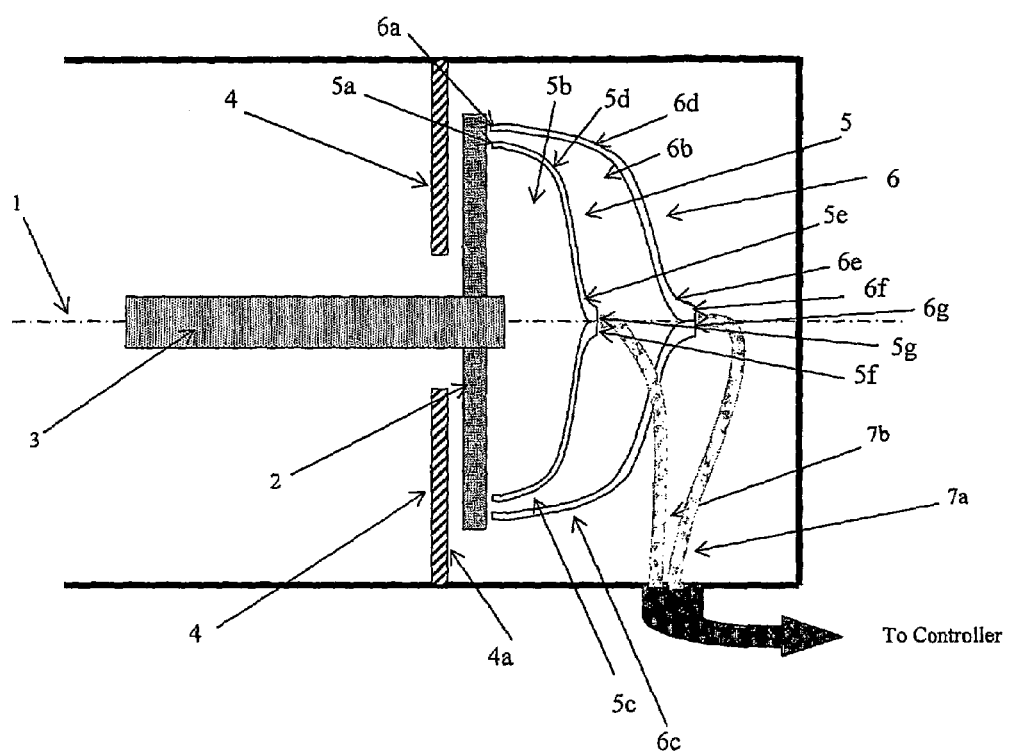
FIG. 1 shows a median sectional view of one embodiment of an encoder assembly according to the invention.

The present invention concerns a method for indicating a rotation angle using an Optical Encoder system that comprises a rotating optical disc, a mirror and at least one Optical Guide having a common symmetry axis, wherein optical beams are emitted from the said Optical Guide such that they are distributed over the circumference of the said rotating optical disc. The beams of light are propagated through the said rotating optical disc onto the said mirror and they are reflected by the said mirror such that they are propagated backwards through the said rotating optical disc into the said Optical Guide. The amount of reflected light emerging from the Optical Guide is measured and a signal is created depending on the rotation angle and indicating the said rotation angle.

According to another aspect the present invention proposes an Optical Encoder assembly comprising a rotating optical disk attached on a rotary shaft, a Cylindrical Optical Guide (COG) having a symmetry axis with the same orientation as the rotation axis of the rotating optical disk and the rotary shaft and a mirror disposed in parallel to the said rotating optical disk such that the rotating optical disk is positioned between the COG and the mirror, the said Optical Encoder assembly further comprising at least one optical fiber having a first end at a light entrance surface through which light is emitted into or received from the said COG and a second end connecting to an electronic interface.

According to yet another aspect the present invention proposes a method for indicating a rotation angle of a rotary shaft using an optical encoder assembly with a first Optical Guide of radial symmetry (OG) that is installed within a second OG of radial symmetry such that the said first and second OGs have a common symmetry axis with the same orientation as the rotation axis of the rotating optical disk, wherein light beams are emitted in the direction of the rotating optical disk from an electronic interface via optical fibers and the said light beams are distributed in the form of two beams with a common radial symmetry center over the circumference of the said rotating optical disc by means of the said OGs. In accordance with the inventive method light rays from the said beams are propagated through the said optical disc in the direction of the mirror and they are reflected by the said mirror such that they pass through the said optical disc in a reverse direction and reenter the said OGs. Each of the OGs then guides the reflected light rays received in it back to the said distant electronic interface by means of the said optical fibers. The said distant electronic interface then converts the optical signals into electronic signals indicating the rotation angle of a shaft onto which the rotating optical disk is affixed.

In accordance with one advantage of the inventive method and assembly highly increased precision can be obtained due to the averaging of the light intensity going through the rotating optical disk over the circumference of the optical disk, this averaging property reducing imprecisions due to mechanical tolerances and irregularities of the rotating optical disk pattern.

It is another advantage of the inventive method and assembly that the electronic interface can be integrated separately inside a system in which the Optical Encoder assembly is implemented such as a motor controller system and that no power supply is required within the Optical Encoder.

It is a further advantage of the inventive assembly and method that no delay is introduced in the angular position information.

It is yet another advantage of the inventive assembly and method that the position signal is a) immune to electrical noise, b) not sensitive to the mechanical eccentric movements of the disc during rotation, c) not sensitive to encoder disc mounting imprecision or to the irregularities of the encoder disc pattern and d) not sensitive to the mechanical vibrations of the disc.

The invention will be described herein below in respect of a preferred embodiment. It will be understood however that other variations and modifications may be made that still remain within the scope of the invention and the claims.

Referring to FIG. 1, a preferred embodiment of an Optical Encoder assembly according to the invention is shown in median sectional view along its symmetry axis 1. The Optical Encoder assembly comprises a rotating Optical Disc 2 that is attached on a Rotary Shaft 3; a mirror 4 that is aligned behind the rotating Optical Disk 2 and in parallel with the said rotating Optical Disk 2 with its reflective surface 4a facing the said rotating Optical Disk 2. The Optical Encoder assembly further comprises a pair of Optical Guides with a cylindrical shape, hereinbelow Cylindrical Optical Guides (COG) 5 and 6, wherein COG 5 has a terminal circumferential rim 5a and a hollow inner volume 5b, and COG 6 has a terminal circumferential rim 6a and a hollow inner volume 6b. The COG 5 has the same shape as the COG 6 but it has a smaller size. The COG 5 is disposed within the hollow inner volume 6b of the COG 6 with the terminal circumferential rims 5a and 6a of the COGs 5 and 6 respectively facing the said rotating Optical Disk 2 such that the symmetry axes of the said COGs 5 and 6 and the rotating axis of the said Motor Shaft 3 are aligned with the assembly symmetry axis 1.

Figure 2:
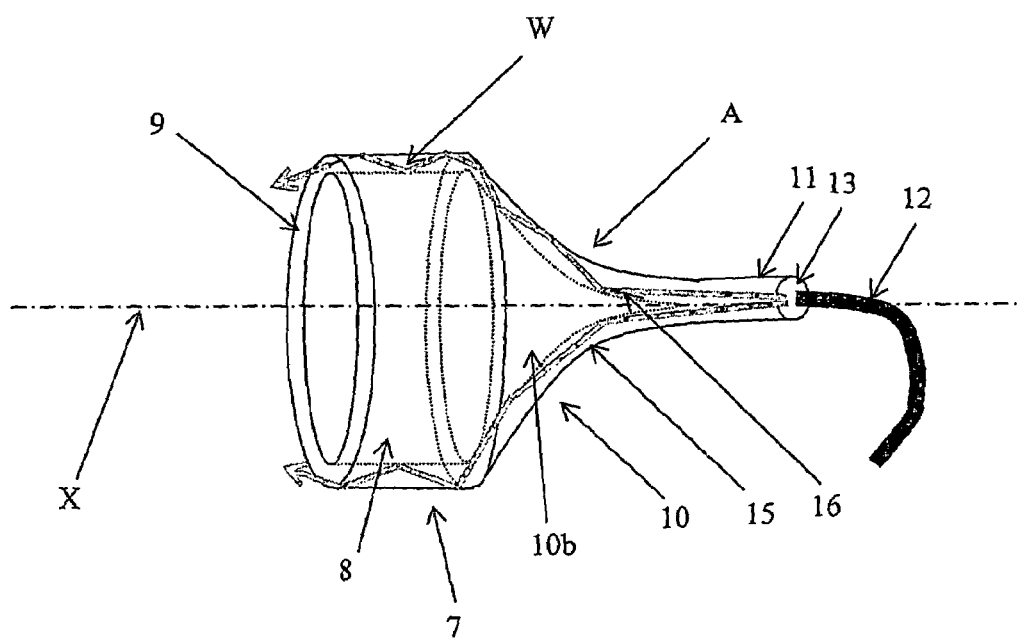
FIG. 2 shows a perspective view of a Cylindrical Optical Guide, and the path of optical rays.

As seen best in FIG. 2, that is a perspective view of a COG according to the preferred embodiment of FIG. 1, generally designated (A), the COG (A) is a hollow structure with a symmetry axis (X) and a transparent surrounding wall (W). In accordance with the preferred embodiment the COG (A)

comprises a hollow cylindrical part 7 with a hollow inner volume 8, the said transparent surrounding wall having at a first end of the said hollow cylindrical part 7 a terminal circumferential rim 9. A hollow funnel shaped part 10 is extending from a second end of the said hollow cylindrical part 7 distally to the said terminal circumferential rim 9, the said hollow funnel shaped part 10 having a hollow inner volume 10b and an end part 11. An Optical Fiber 12 enters the COG at a light entrance surface 13 within the said end part 11, such that the middle line of the The invention will be described herein below in respect of a preferred embodiment. It will be understood however that other variations and modifications may be made that still remain within the scope of the invention and the claims.

Referring th FIG. 1, a preferred embodiment of an Optical Encoder assembly according to the invention is shown in median sectional view along its symmetry axis 1. The Optical Encoder assembly comprises a rotating Optical Disk 2 that is attached on a Rotary Shaft 3; a mirror 4 that is aligned behind the rotating Optical Disk 2 and in parallel with the said rotating Optical Disk 2 with its reflective surface 4a facing the said rotating Optical Disk 2. The Optical Encoder assembly further comprises a pair of Optical Guides with a cylindrical shape, hereinbelow Cylindrical Optical Guides (COG) 5 and 6, wherein COG 5 has a terminal circumferential rim 5a and a hollow inner volume 5b, and COG 6 has a terminal circumferential rim 6a and a hollow inner volume 6b. The COG 5 has the same shape as the COG 6 but it has a smaller size. The COG 5 is disposed within the hollow inner volume 6b of the COG 6 with the terminal circumferential rims 5a and 6a of the COGs 5 and 6 respectively facing the said rotating Optical Disk 2 such that the symmetry axes of the said COGs 5 and 6 and the rotating axis of the said Motor Shaft 3 are aligned with the assembly symmetry axis 1.

As seen best in FIG. 2, that is a perspective view of a COG according to the preferred embodiment of FIG. 1, generally designated (A), the COG (A) is a hollow structure with a symmetry axis (X) and a transparent surrounding wall (W). In accordance with the preferred embodiment the COG (A) comprises a hollow cylindrical part 7 with a hollow inner volume 8, the said transparent surrounding wall having at a first end of the said hollow cylindrical part 7 a terminal circumferential rim 9. A hollow funnel shaped part 10 is extending from a second end of the said hollow cylindrical part 7 distally to the said terminal circumferential rim 9, the said hollow funnel shaped part 10 having a hollow inner volume 10b and an end part 11. An Optical Fiber 12 introduces light rays into the COG through a light entrance surface 13 of the said end part 11, such that the said Optical Fiber 12 is aligned with the said symmetry axis (X) of the COG at the said light entrance surface 13.

The COG behaves by the same principle as an Optical Fiber. The shape and material of the COG is designed in such a way that Optical rays entering the COG (A) via the Optical Fiber 12 will always encounter the inner surface or the outer surface of the transparent surrounding wall (W) at an incident angle that is smaller than the Total Reflection minimum angle. Consequently, and as demonstrated in FIG. 2, the Optical rays 15, 16, introduced to the COG (A) through the Optical Fiber 12, are reflected into the inner volume of the said transparent surrounding wall (W) to be confined within the said inner volume of the transparent surrounding wall (W) until they reach the said terminal circumferential rim 9 of the COG (A) where the Optical rays 15, 16 output the COG volume. It will be understood that the light beam emerging from the said terminal circumferential rim 9 will have a circular shape.

It will be understood that the inventive Optical Guide may be made in accordance with different designs including non symmetrical designs as long as the terminal circumferential rim remains Referring again to FIG. 1, each of the COGs 5 and 6 comprises a hollow cylindrical part respectively designated 5c and 6c and each of the said COGs 5 and 6 is surrounded by peripheral walls 5d and 6d respectively, the said peripheral walls 5d and 6d terminating in terminal circumferential rims 5a and 6a respectively. Funnel shaped hollow parts 5e and 6e are extending from the said cylindrical parts 5a and 6a respectively, distally to the said terminal circumferential rims 5a and 6a. The said funnel shaped hollow parts 5e and 6e have end parts 5f and 6f respectively and Optical Fibers 7a, 7b are connected to the said ends 5f and 6f of the said COGs 5 and 6 at light entrance surfaces 5g and 6g respectively such that the middle lines of the said Optical Fibers 7a, 7b are aligned with the said symmetry axis 1 of the said COGs 5 and 6 at the said light entrance surfaces 5e and 6e respectively.

An arrow R indicates the direction of an electronic surface (not shown) to which the Optical Fibers 7a and 7b are leading.

It will be understood that due to the structure and composition of the peripheral walls 5b and 6b of the COGs 5 and 6 that confines any light rays coming from the Optical Fibers 7a and 7b respectively within the inner volumes of the said peripheral walls 5b and 6b, in the arrangement of FIG. 1 two concentric circular beams of light will be emitted by the COGs 5 and 6 in the direction of the Optical Disk 2.

Figure 3:
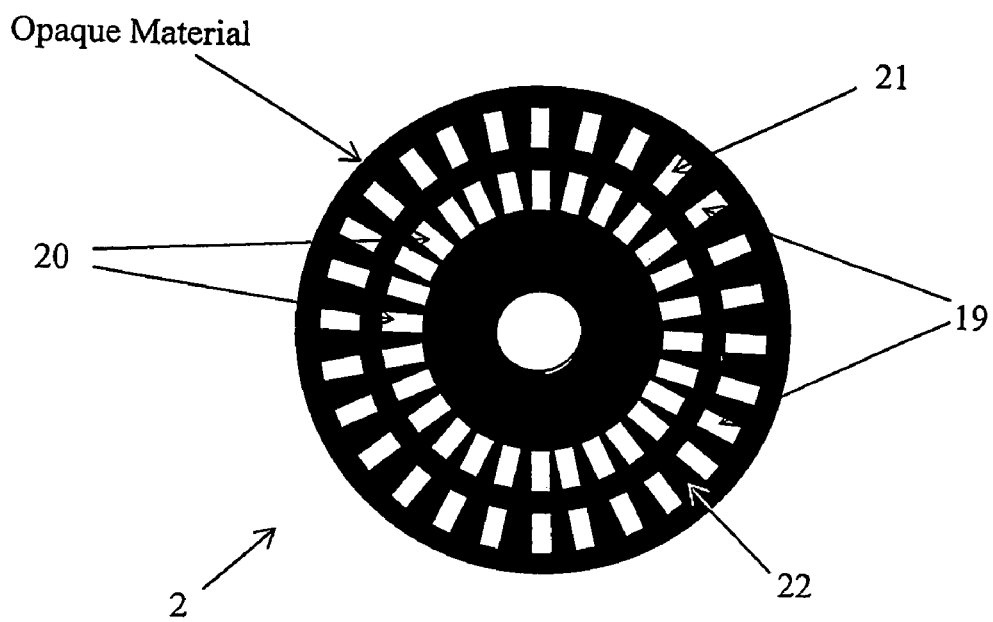
FIG. 3 shows a Rotating Optical disc

In FIG. 3 an enlarged diagram of the rotating Optical Disk 2 is shown. The rotating Optical Disk 2 is made of an absorbent material. On the rotating Optical Disk two concentric circular patterns 19 and 20 of alternating transparent windows 21 and absorbent sections 22 are provided. In accordance with the preferred embodiment, the two concentric patterns 19 and 20 on the rotating Optical Disk 2 are designed with a fixed angle offset. It will be understood however that other patterns may be used and neither the invention nor the preferred embodiment are limited to the pattern that is shown in FIG. 3 by way of example only.

Referring again to FIG. 1, in accordance with the inventive method the light rays exiting from each of the terminal circumferential rims 5c and 6c of the COGs 5 and 6 of FIG. 1 respectively are directed towards the rotating Optical Disk 2. The respective sizes of the COGs 5 and 6 are selected such that the COG 5 spreads the input Optical beam into a first circular beam on the inner of the two circular concentric patterns provided on the rotating Optical Disk 2 while the COG 6 spreads the input Optical beam into a second circular beam on the outer of the two circular concentric patterns provided on the said rotating Optical Disk 2.

Due to the pattern of alternating transparent windows 20 and absorbent sections 21 on the rotating Optical Disk 2, rays of light in each of the circular beams emerging from the said terminal circumferential rims 5c and 6c of the said COGs 5 and 6 respectively are partially absorbed in the absorbent sections 21 of the said Optical Disk 2 and partially transmitted to the mirror 4 through the transparent windows 21.

Figure 4:
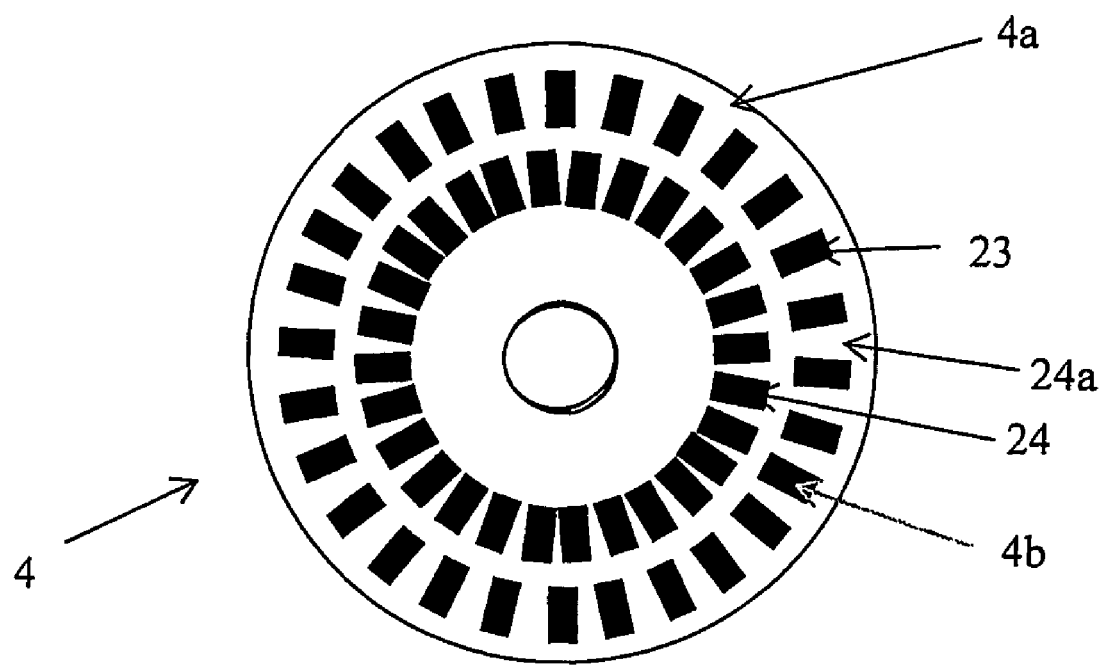
FIG. 4 shows a Patterned Mirror

As seen best in FIG. 4, that is an enlarged diagram of a mirror suitable to be applied as the mirror 4 in the Optical encoder assembly of FIG. 1 together with the Optical Disk shown in FIG. 3, the mirror 4 has a reflective surface 4a facing the rotating Optical disk 2. On the reflective surface 4a two concentric circular patterns 23 and 24 of absorbent sections 4b are provided, with a geometric arrangement similar to that of the Rotating Optical Disk 2. It will be understood however that other patterns may be used and neither the invention nor the embodiments shown in FIGS. 1 and 6-9 are limited to the pattern that is shown in FIG. 4 by way of example only.

Referring again to FIG. 1, whenever optical rays of a beam of light emerging from one of the said terminal circumferential rims 5c and 6c of the said COGs 5 and 6 and propagated through the transparent windows 21 on the Optical Disk 2 encounter a section of the mirror 4 having reflective properties, the said optical rays are reflected backward to the Rotating Optical Disk 2, and through the transparent windows 21 on the Rotating Optical Disk they regain the terminal circumferential rims 5c and 6c of the COGs 5 and 6 respectively. The reflected light rays then reenter the COGs 5 and 6 through the said terminal circumferential rims 5c and 6c, to be guided back to the COG light entrance surfaces 5e and 6e respectively where they are collected by the optical fibers 7a and 7b and conducted to the distant electronic surface that produces the signals indicating the rotation angle and direction of the rotary shaft.

In accordance with the inventive method and assembly, the amount of reflected light returned to the terminal circumferential rims 5c and 6c of the COGs 5 and 6 respectively is dependent on the position of the Rotating Optical Disk 2 relative to the mirror 4. Whenever the Rotating Optical Disk 2 is in a position where the absorbent sections 23 of the mirror 4 coincides with the transparent sections 21 of the Rotating Optical Disk 2, then a minimum of light is reflected. Whenever the Rotating Optical Disk 2 is in a position where the reflective section 24a of the mirror 4 coincides with the transparent sections 21 of the Rotating Optical Disk 2, a maximum amount of light is reflected. The concentric patterns of the Rotating Optical Disk 2 and the mirror 4 are designed so that the amounts of light reflected back from the mirror 4 through the Rotating Optical Disk 2 to the terminal circumferential rims 5c and 6c give rise to a pair of separate optical signals, each of the said optical signals being a periodic function of the rotation angle of the Motor Shaft 3.

In accordance with the preferred embodiment, the concentric patterns on the Rotating Optical Disk 2 and the mirror 4 are designed with a fixed angle offset, so that the said pair of optical signals, having the same angular periodic form, present a quarter of the angular period phase difference.

Figure 5:
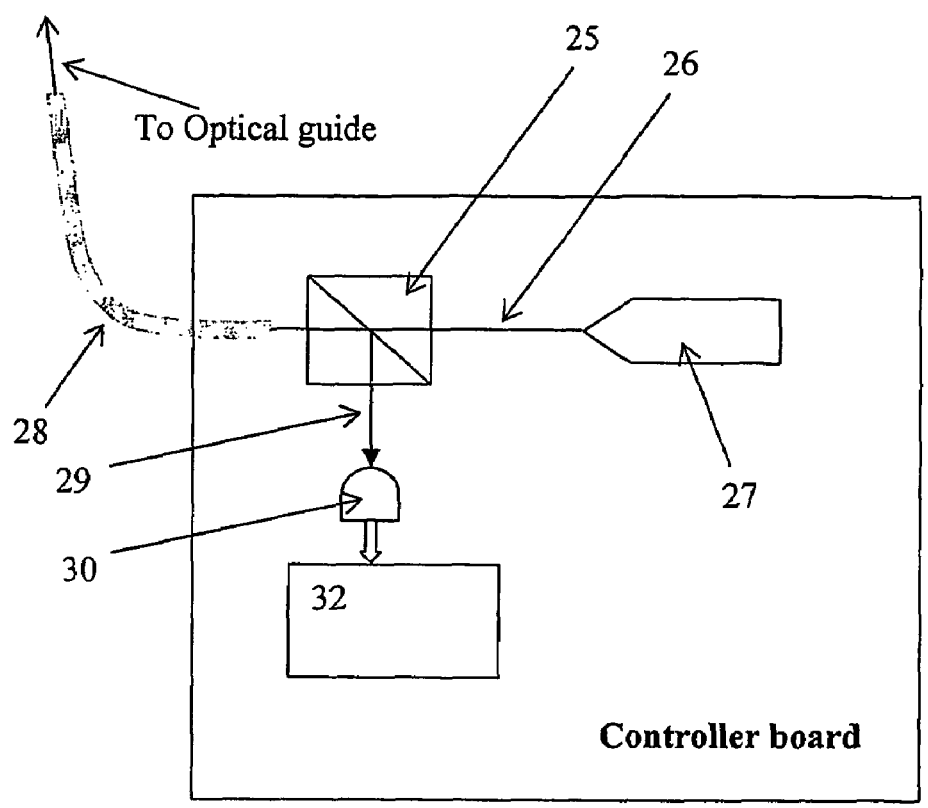
FIG. 5 shows an embodiment where light beams input to the encoder, and light beams returned by encoder are separated by means of a beam splitter

FIG. 5 shows one way of directing a beam emitted from a light source into an Optical Fiber, and of guiding the reflected light to an electronic surface distant from the inventive encoder using a light detector. In the embodiment of FIG. 5 this is done by means of a well-known technique of beam splitting. As seen in FIG. 5, a Beam Splitter 25 is used to enable the propagation of a beam 26 emitted from a light source 27 towards an Optical Fiber 28 that conducts the said beam 26 to an Optical Guide, not shown in FIG. 5. It is further shown in FIG. 5 that a reflected light beam returning from an Optical Guide is propagated through the said Optical Fiber 28 to the said beam splitter 25 such that the said beam splitter 25 directs the said light beam, designated 29, to a light detector 30. The said reflected light beam 29 is then converted to an electronic signal 31 by means of the light detector 30 and the said electronic signal 31 is sent to an Electronic Interface 32 according to known techniques. It will be understood that in the preferred embodiment of FIG. 1 two beams will be reflected from two Optical Guides and two electronic signals will be sent to the Electronic Interface 32 such that the electronic interface 32 may be used to convert these signals into position information as known.

Figure 6:
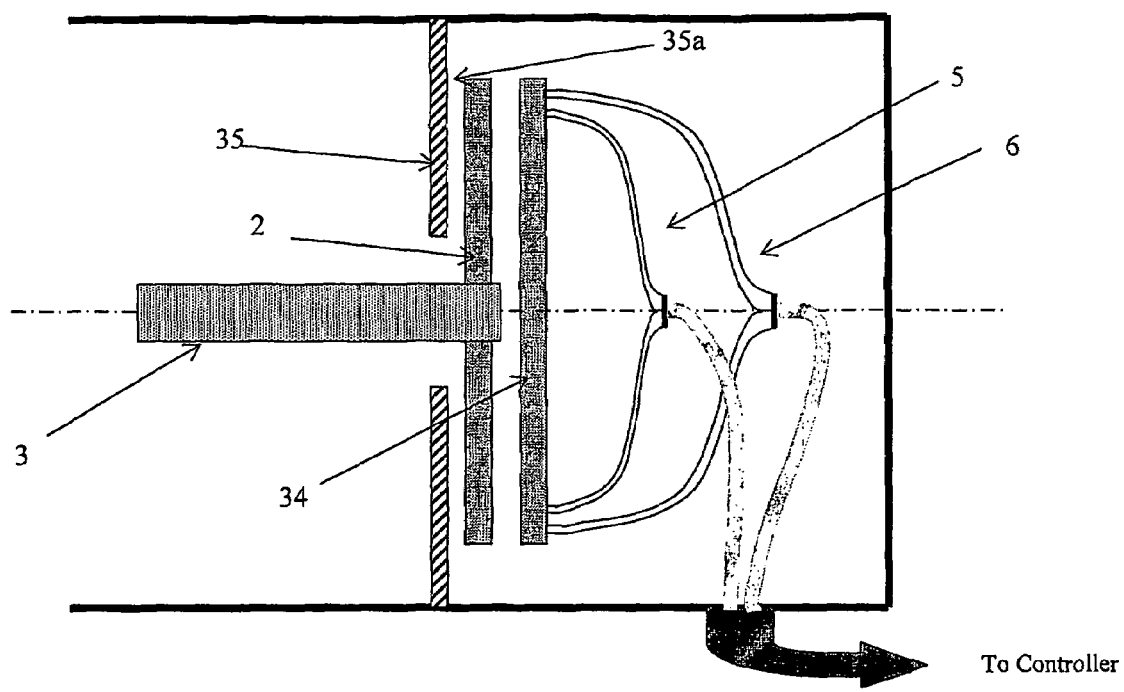
FIG. 6 shows a median sectional view of a second embodiment where a static optical disc placed between the rotating optical disc and the Cylindrical Optical Guides replaces the pattern on the mirror of the first embodiment.

FIG. 6 shows another embodiment of the inventive Optical Encoder shown in vertical cross section along its symmetry axis 1, wherein the elements of the inventive Optical Encoder that are common to the embodiments of FIGS. 1 and 6 have been designated by the same numerals.

Figure 7:
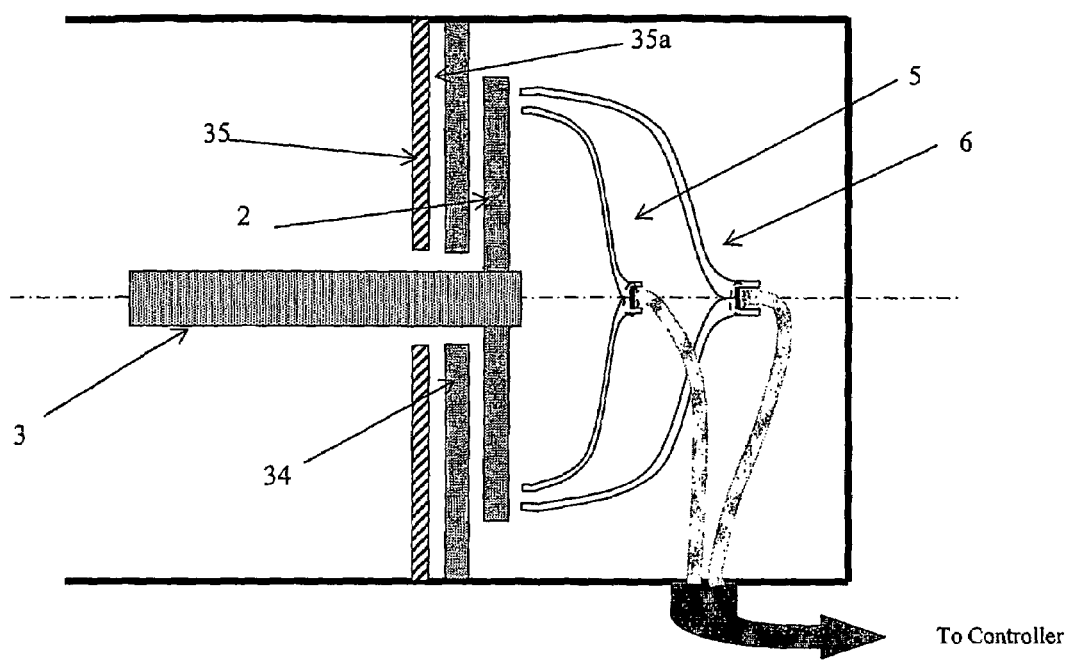
FIG. 7 shows a median sectional view of a third embodiment where a static optical disc placed between the rotating optical disc and the mirror replaces the pattern on the mirror of the first embodiment.

In the embodiment of FIG. 6 a patterned static optical disk 34 is disposed between the terminal circumferential rims 5c and 6c of the COGs 5 and 6 and the rotating optical disc 2 such that the said patterned static optical disk 34 has the same symmetry axis 1 and lies in the same perpendicular plane as the rotating optical disk 2. It is a further characteristic of the embodiment of FIG. 6 that instead of the patterned mirror 4 of FIG. 1, in the embodiment of FIG. 6 a plain mirror 35, having a reflective surface 35a without a pattern of non reflective sections is used, the said plain mirror 35 being aligned in parallel with the said rotating Optical Disk 2 along the symmetry axis 1 and the said mirror 35 having a reflective surface 35a facing the said static Optical Disk 34 and the said Rotating Optical Disk 2. FIG. 7 shows a further embodiment of the inventive Optical Encoder that is similar to the embodiment of FIG. 6. In FIG. 7 the same numerals are used to designate elements that are common to FIGS. 6 and 7. In the embodiment of FIG. 7 the rotating optical disk 2 is placed between the said COGs 5 and 6 and the said fixed optical disc 34.

It will be understood by those versed in the art that another variation of the embodiment of FIG. 7 may be made in which the mirror 35 is fixed and the optical disk 34 is rotating.

It will be understood that in the embodiments of FIGS. 6 and 7 a light source positioned behind the rotating optical disk 2 and the patterned static optical disk 34 may be used instead of the light beams emitted from the terminal circumferential rim of the COGs 5 and 6. In this case the COGs 5 and 6 only serve to guide the light passing through the rotating optical disk 2 and the patterned static optical disk 34 to the light entrance surfaces 5e and 6e of the said COGs 5 and 6 respectively.

It will be further understood that in the embodiment of FIGS. 6 and 7 light sensor means positioned behind the rotating optical disk 2 and the patterned static optical disk 34 may be used to directly sense the amount of light passing through the said optical disks 2 and 34.

Figure 8:
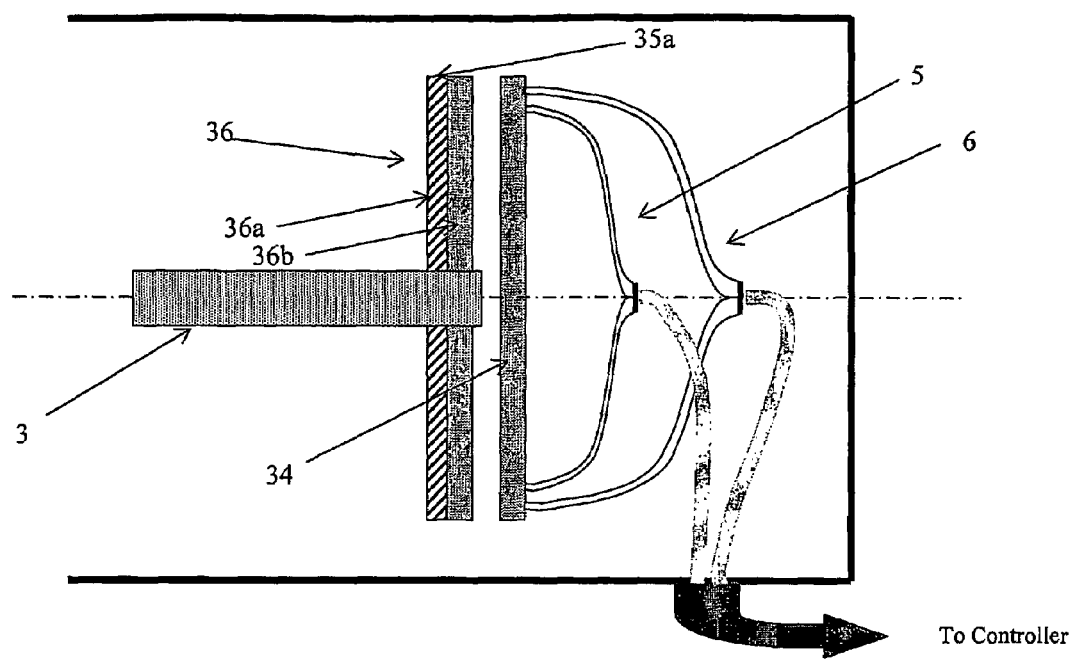
FIG. 8 shows a median sectional view of a further embodiment of the encoder assembly of FIG. 6, where the mirror is directly attached on the back of the rotating optical disc

FIG. 8 shows yet another embodiment of the inventive Optical Encoder that is similar to that of FIG. 6, comprising a static Optical Disk 34 and an integrated rotating element 36, the said integrated rotating element comprising a mirror 36a and an Optical Disk 36b such that a single disk having sections with alternate reflective and absorbent properties is achieved The said integrated rotating element is fixed to the shaft 3 and lies in a perpendicular plane that is parallel to the perpendicular plane of the static Optical Disk 34. It will be understood that another variation of the preferred embodiment may be used in which the mirror 36a and the Optical Disk 36b are separately fixed to the shaft X. The elements of the inventive Optical Encoder that are common to the embodiments of FIGS. 6 and 8 have been designated by the same numerals.

Figure 9:
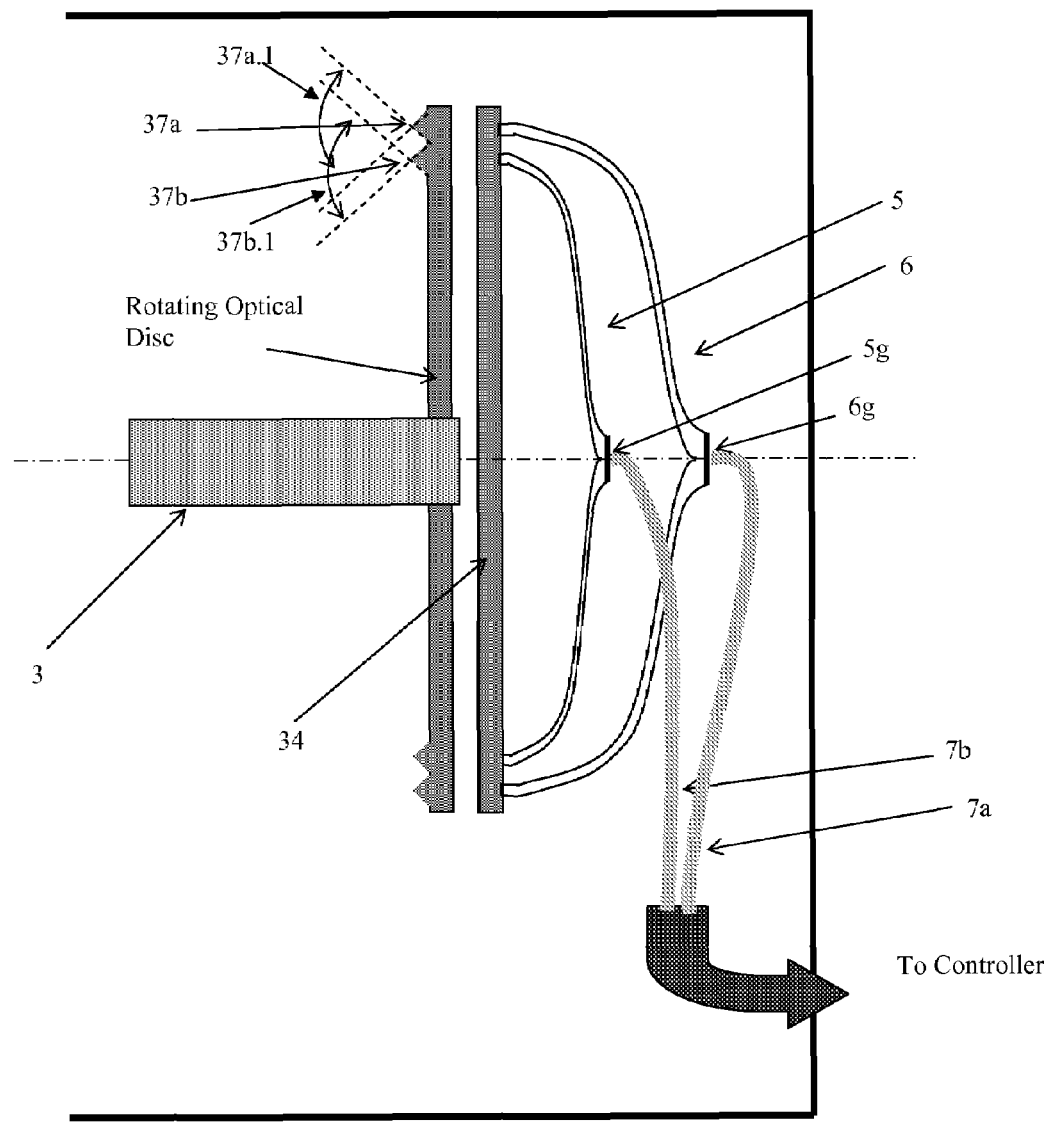
FIG. 9 shows a median sectional view of another embodiment where a "Corner Reflector surface" replaces the mirror

FIG. 9 shows an embodiment of the inventive Optical Encoder that is similar to that of FIG. 6, wherein the mirror is replaced by a retro-reflective surface. Those versed in the art will be aware of the advantages of applying a retro-reflective surface in the inventive Optical Encoder assembly, such surfaces having the characteristic of reflecting incident light rays in a direction that is exactly parallel and opposite to their incident direction. In the specific embodiment of FIG. 9, the retro-reflective surface is implemented in the form of two annular V-shaped protrusions 37a and 37b of transparent material, on the back surface of the disc. The respective angles 37a.1 and 37b.1 of the said V shape protrusions 37a and 37b are 90 degrees, so that rays exiting the COGs will be returned to the COGs. These two V-shaped protrusions advantageously replace the mirror shown in FIG. 8.

It will be understood that any mirrors and reflective surfaces to be applied in the different embodiments of the inventive Optical Encoder assembly may be replaced by a retro-reflective surface.

Figure 10:
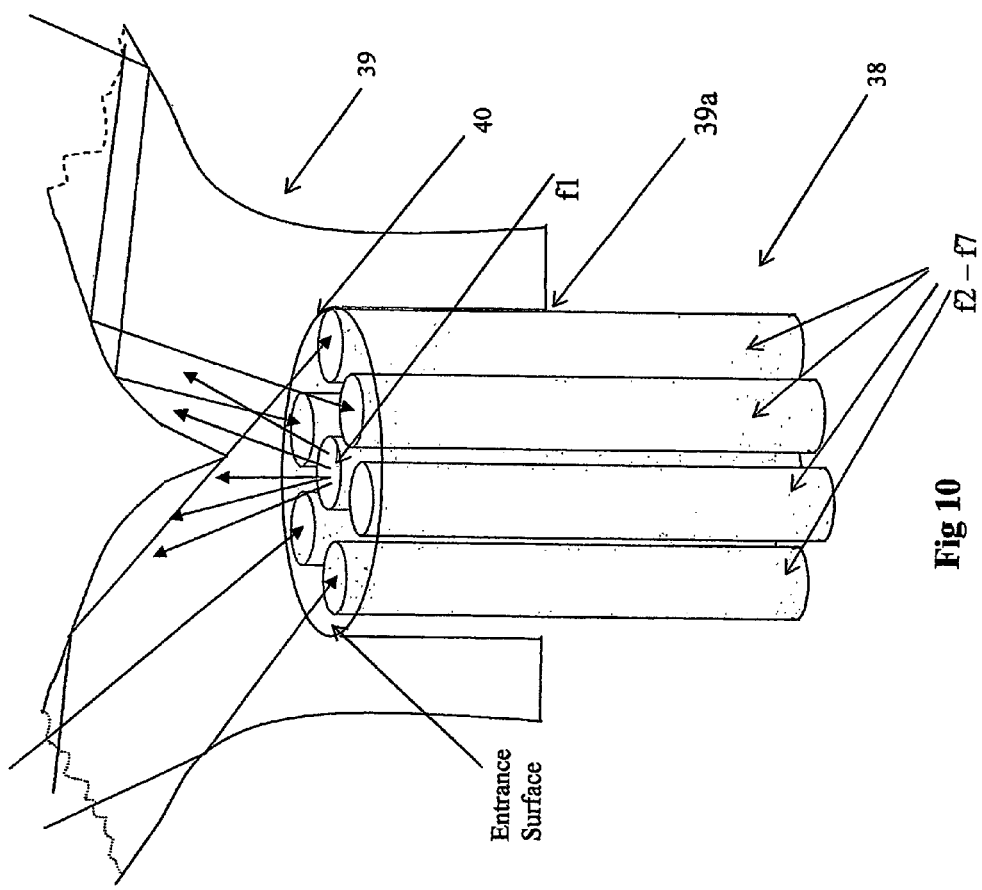
FIG. 10 shows a bundle of fibers to be applied in an optical encoder assembly in accordance with an embodiment of the invention

In FIG. 10 yet another embodiment is shown wherein a bundle of optical fibers 38 is used in place of a single Optical fiber such as Optical fibers 7a and 7b of FIG. 1. FIG. 10 shows a fractional median section of the end part 39 a of a COG 39 revealing a perspective view of a plurality of Optical Fibers f1-f7 comprised in the said bundle 38. As seen in FIG. 10, the said Optical fibers f1-f7 enter the open end 39a of the said COG 39 at a light entrance surface 40 wherein Optical Fiber f1 is used for emitting light to the COG 39, while Optical Fibers f2-f7 are used to receive light returned by the Optical Encoder system. The bundle of optical fibers f1-f7 advantageously replaces the beam splitting technique shown in FIG. 5 when applied in an Optical Encoder assembly such as the embodiments of FIGS. 1 and 6-9. Referring again to FIG. 10, the light emitting fiber f1 is coupled to a light source, not shown, while the light receiving fibers f2-f7 are coupled to a light sensor that is also not shown. It will be understood that the number of optical fibers used for this embodiment may vary as well as the number of fibers used for light reception or light emission, and the optical fibers may be arranged in two or more bundles.

Figure 11:
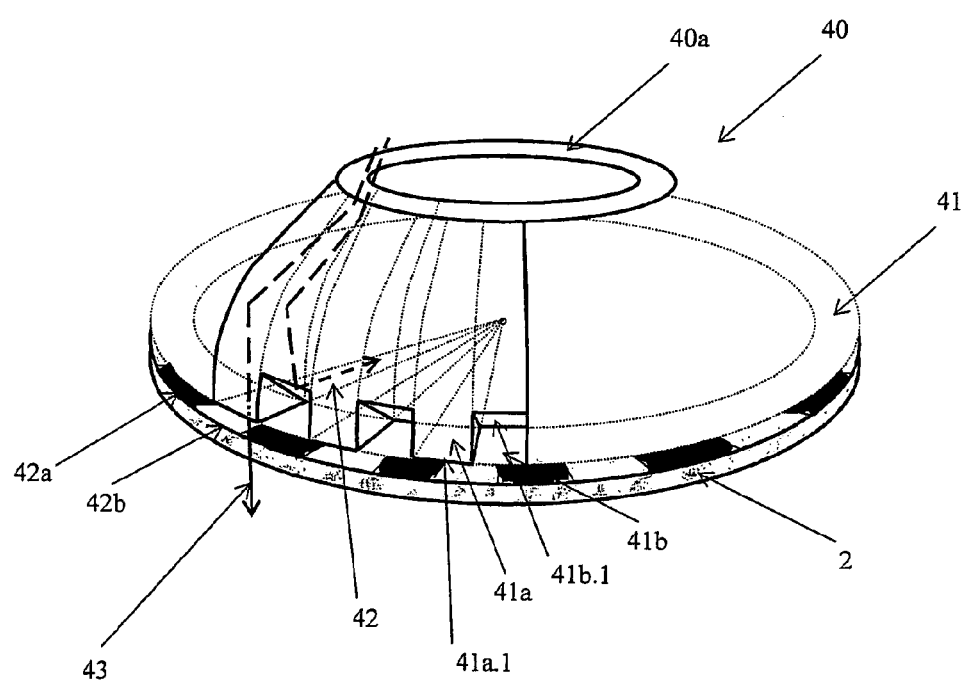
FIG. 11 shows a median sectional view of an embodiment as in FIG. 6, in which the fixed optical disc is replaced by a special design of the Cylindrical Optical Guide terminal circumferential rim.

In FIG. 11 is shown a specially designed COG 40 to be applied in an Optical Encoder assembly such as the embodiment shown in FIG. 6 so as to replace the static optical disk 34. In FIG. 4 only a section of the peripheral wall of the COG 40 is shown, horizontally extending between lines A and A1 and vertically extending between the end part 40a and the terminal circumferential rim 41. The terminal circumferential rim 41 of the COG 40 is divided into alternating emitting/receiving sections 41a and non-emitting/receiving sections 41b, wherein an emitting/receiving section 41a has a terminal surface 41a.1 parallel to the rotating optical disc 2 and a non-emitting section 41b has a terminal surface 41b.1 presenting an angle with the rotating optical disc 2, such that rays of light emerging from a non-emitting section 41b are deflected and lost as shown by the dashed line 42 while rays of light emerging from an emitting section 41a reach the rotating optical disk 2 as shown by dashed line 43. It will be understood that the dark areas 42a and the light areas 42b indicate the alternating light absorbent areas and transparent areas of the optical disk 2 respectively. This embodiment of the invention has the advantage that the static optical disc is eliminated, and the terminal circumferential rim 41 of the COG 40 can be installed at a position closer to the rotating optical disc 2. It will be further understood that as a result loss of reflected rays is diminished and efficiency is improved, i.e. the ratio of reflected rays relative to incident rays is increased.

The invention claimed is:

1. A method for measuring a rotation angle of a rotary shaft, the method comprising:

a) providing an optical encoder assembly comprising a rotating optical disk with a pattern of transparent and absorbent sections, and a mirror patterned in a predetermined pattern;

b) providing at least one optical guide means having a light entrance surface, a hollow inner space, a transparent peripheral wall configured to confine light rays within itself, and a terminal peripheral rim;

c) directing an optical beam emitted from a light source into the light entrance of said optical guide means such that light rays of said beam are propagated within the transparent peripheral wall of the optical guide means, emitted from its terminal peripheral rim, distributed over said rotating optical disc to overlie its pattern and propagated through its transparent sections to become incident on said predetermined pattern on said mirror; and d) translating the amount of light reflected by the said mirror and propagated backwards through the said rotating optical disk into the said optical guide means to a signal indicative of said rotation angle.

2. A method for measuring a rotation angle according to claim 1, wherein the pattern of transparent and absorbent sections is circular and the optical guide means is cylindrical.

3. A method for measuring a rotation angle according to claim 1, wherein the optical guide means comprises a pair of a first and second cylindrical optical guides each of which having a light entrance surface, a hollow inner space, a transparent peripheral wall configured to confine light rays within itself, and a terminal peripheral rim facing the said optical disc, and wherein said first cylindrical optical guide is installed within the hollow inner space of said second cylindrical optical guide on a common symmetry axis, and the rotating optical disk comprises two concentric patterns of absorbent and transparent sections, said method further comprising directing an additional beam of light such that a pair of a first and a second light beams are directed into said first and second cylindrical optical guides through their light entrances respectively, and such that two concentric circles of light are incident on the two concentric patterns of absorbent and transparent sections of said rotating optical disk.

4. A method for measuring a rotation angle according to claim 3, wherein the said mirror has two concentric circular patterns of reflective and absorbent sections, the said concentric circular patterns being disposed on the said mirror at the same radial positions as the radial positions of the two concentric circular patterns of transparent and absorbent sections on the optical disk, whereby only the rays of tight incident on the said reflective sections arc returned to the said first and second optical guide means such dint the amount of light output by each of the said optical guide means depends on the relative angular positions of the rotating optical disk and the mirror.

5. A method for measuring a rotation angle according to claim 3, wherein the mirror is a plain mirror and the tight beams emerging from the said cylindrical optical guides are first propagated through a static optical disk that is disposed between the said cylindrical optical guides and the said rotating optical disk and then through the said rotating optical disk.

6. A method for measuring a rotation angle according to claim 3, wherein the light beams emerging from the said cylindrical optical guides are first propagated through a static optical disk and then through the said rotating optical disk and the mirror is attached to the said rotating optical disk.

7. A method for measuring a rotation angle according to claim 1, wherein the said pattern on said mirror consists of reflective and absorbent sections and only the rays of light incident on the said reflective sections are returned to the optical guide means such that the amount of light output by the said optical guide means depends on the relative positions of the rotating optical disk and the mirror.

8. A method for measuring a rotation angle according to claim 1, wherein the said pattern on said mirror is a circular pattern of reflective and absorbent sections that is, disposed at the same radial position as the radial position of the circular pattern of transparent and absorbent sections on the optical disk whereby only the rays of light incident on the said reflective sections are returned to the optical guide means such that the amount of light output by the said optical guide means depends on the relative angular positions of the rotating optical disk and the mirror.

9. A method for measuring a rotation angle according to claim 1, wherein a bundle of optical fibers is used such that one optical fiber emits light into the optical guide means and other optical fibers collect light from the said optical guide means.

10. A method for measuring a rotating angle by an optical encoder assembly according to claim 1 wherein light from the said light source is emitted into the optical guide means by an optical fiber and the light backwards into the said optical guide means is collected by further optical fibers and the said optical fiber are arranged in a bundle of optical fibers.

11. The method according to claim 1, wherein the said patterned mirror is a static optical mirror.

12. An optical encoder assembly for indicating the angular position of a rotary shaft, comprising the following elements having a common symmetry axis:
  a. a rotary shaft;
  b. a rotating optical disk centrally attached to the said rotary shaft and perpendicularly inclined relative to the said rotary shaft, the said rotating optical disk having a pattern of alternating light absorbing and transparent surfaces;
  c. at least one optical guide means having a hollow inner space, a transparent peripheral wall configured to confine light rays within itself, and a terminal peripheral rim facing a front side of the said rotating optical disk for emitting light rays in the direction of the said optical disk and receiving light rays from the direction of the said optical disk; and
  d. a mirror patterned in a predetermined pattern and disposed behind the said optical disk distally to the said optical guide means and inclined in parallel to the said rotating optical disk such that a reflective face of the said mirror is facing a back side of the said rotating optical disk.

13. An optical encoder assembly for indicating the angular position of a rotary shaft according to claim 12 wherein the said optical encoder assembly further comprises an optical fiber entering the said optical guide means at a light entrance surface for leading light beams emitted from a light source into the said optical guide means and leading light beams output by the said optical guide means out of the said optical guide means to an electronic surface, the middle line of the said optical fiber being aligned with the said symmetry axis at the said light entrance surface.

14. An optical encoder assembly for indicating the angular position of a rotary shaft according to claim 13 wherein the said mirror is a static mirror and the said predetermined pattern is a pattern of reflective and absorbent sections.

15. An optical encoder for indicating the angular position of a rotary shaft according to claim 12 wherein the said pattern of transparent and absorbent sections on the said rotating optical disk is a circular pattern and the said optical guide means is a cylindrical optical guide.

16. An optical encoder assembly for indicating the angular position of a rotary shaft according to claim 15 wherein the said mirror is a static mirror and the said predetermined pattern is a pattern of reflective and absorbent sections.

17. An optical encoder assembly for indicating the angular position of a rotary shaft according to claim 15 wherein the said optical encoder assembly comprises a bundle of optical fibers with separate optical fibers for leading light beams emitted from a light source into the said optical guide means and for leading light beams output by the said optical guide means out of the said optical guide means.

18. An optical encoder assembly for indicating the angular position of a rotary shaft according to claim 17 wherein the said mirror is a static mirror and the said predetermined pattern is a pattern of reflective and absorbent sections.

19. An optical encoder assembly for indicating the angular position of a rotary shaft according to claim 15 wherein the said pattern of transparent and absorbent sections on the said rotating optical disk consists of two concentric circles of alternating absorbent and transparent sections, and the said at least one optical guide means comprises a first cylindrical optical guide that is installed within the hollow inner space of a second cylindrical optical guide such that the said first and second cylindrical optical guides have a common symmetry axis and each of the said cylindrical optical guides has a peripheral wall that ends in a terminal peripheral rim facing the said rotating optical disk.

20. An optical encoder assembly for indicating the angular position of a rotary shaft according to claim 19 wherein the said mirror is a static mirror and the said predetermined pattern is a pattern of reflective and absorbent sections.

21. An optical encoder assembly for measuring a rotating angle according to claim 19 wherein a patterned static optical disk is disposed between the said cylindrical optical guides and the said rotating optical disk, the said optical encoder assembly comprising a retro-reflective surface in substitution of the mirror.

22. An optical encoder assembly for indicating the angular position of a rotary shaft according to claim 12 wherein the said mirror is a static mirror and the said predetermined pattern is a pattern of reflective and absorbent sections.

23. An optical encoder assembly for indicating the angular position of a rotary shaft according to claim 12 wherein the said predetermined pattern of said mirror is a circular pattern of reflective and absorbent sections that is disposed at the same geometrical position as the circular pattern of transparent and absorbent section son the optical disk.

24. An optical encoder assembly for indicating the angular position of a rotary shaft according to claim 12 wherein the said predetermined pattern of said mirror has comprises two concentric circular patterns being disposed at the same geometrical positions as the two concentric circular patterns of transparent and absorbent sections on the optical disk.

25. An optical encoder assembly for indicating the angular position of a rotary shaft according to claim 12 comprising a retro-reflective surface in substitution of the mirror.

26. An optical encoder assembly for indicating the angular position of a rotary shaft according to claim 12 wherein on the back surface of the said disk a retro-reflective surface consisting of two annular V shaped protrusions extending around the circumference of the said disk is provided.

27. An optical encoder assembly for measuring a rotating angle according to claim 12 wherein a patterned static optical disk is disposed between the said cylindrical optical guide means and the said rotating optical disk and the mirror is plain.

28. An optical encoder assembly according to claim 27 wherein one or more light sources are positioned behind the said rotating optical disk and the said patterned static optical disk and light passes through the optical guide means from the direction of the said rotating optical disk and the said patterned static optical disk to the said light entrance surface of the said optical guide.

29. An optical encoder assembly for measuring a rotating angle according to claim 27 wherein the said rotating optical disk is attached to the surface of the said plain mirror that reflects the incident rays of light backwards to the said cylindrical optical guide means.

30. An optical encoder assembly for indicating the angular position of a rotary shaft according to claim 12 wherein the said optical guide means is a cylindrical optical guide with a transparent peripheral wall that is optically designed to combine the light rays within itself, the said transparent peripheral wall terminating in a terminal peripheral rim of circular form that is facing a front side of the said rotating optical disk so as to emit a circle of light onto the said circular pattern said front side of the said optical disk.

31. An optical encoder assembly for indicating the angular position of a rotary shaft according to claim 30 wherein the said optical encoder assembly further comprises an optical fiber entering the said optical guide means at a light entrance surface for lending light beams emitted from a light source into the said optical guide and leading light beams output by the said optical guide out of the said optical guide to an electronic surface, the middle line of the said optical fiber being aligned with the said symmetry axis at the said light entrance surface.

32. An optical encoder assembly for measuring a rotating angle according to claim 12 wherein the said optical guide means has a terminal peripheral rim facing tho said optical disk and on the terminal peripheral rim alternating emitting/receiving and non emitting/receiving sections are provided.

33. An optical encoder assembly according to claim 32 wherein the said emitting/receiving sections are sections with a straight perimeter whereas the non-emitting/receiving sections have a perimeter that is inclined at a suitable angle that causes reflection of light rays passing through the said perimeter.

* * * * *